(12) United States Patent  
Ritchy et al.

(10) Patent No.: US 8,065,415 B2  
(45) Date of Patent: Nov. 22, 2011

(54) SYSTEM AND METHOD FOR UTILIZING A COMMON FRAMEWORK FOR PORTAL ADMINISTRATION TOOLS

(75) Inventors: Robert Ritchy, Boulder, CO (US); Christopher E. Bales, Boulder, CO (US); Skip Sauls, Longmont, CO (US); Jeffrey Mueller, Superior, CO (US); Melissa Dawe, Boulder, CO (US); Shane Pearson, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1489 days.

(21) Appl. No.: 10/962,090

(22) Filed: Oct. 8, 2004

(65) Prior Publication Data

US 2005/0257227 A1    Nov. 17, 2005

Related U.S. Application Data

(60) Provisional application No. 60/571,105, filed on May 14, 2004.

(51) Int. Cl.
*G06F 15/173* (2006.01)
*G06F 17/00* (2006.01)
*G06F 15/16* (2006.01)

(52) U.S. Cl. .................. 709/225; 715/236; 709/208

(58) Field of Classification Search .................. 709/224, 709/225, 218; 719/328; 717/102, 115; 715/236
See application file for complete search history.

(56) References Cited

U.S. PATENT DOCUMENTS

| | | | |
|---|---|---|---|
| 6,961,776 B1 * | 11/2005 | Buckingham et al. | 709/229 |
| 7,171,692 B1 * | 1/2007 | DeMello et al. | 726/26 |
| 7,448,024 B2 * | 11/2008 | Breeden et al. | 717/125 |
| 2004/0107250 A1 * | 6/2004 | Marciano | 709/204 |
| 2004/0187140 A1 * | 9/2004 | Aigner et al. | 719/328 |
| 2005/0188080 A1 * | 8/2005 | Motsinger et al. | 709/224 |
| 2006/0059107 A1 * | 3/2006 | Elmore et al. | 705/64 |

* cited by examiner

*Primary Examiner* — Phuoc Nguyen
*Assistant Examiner* — Mark Fearer
(74) *Attorney, Agent, or Firm* — Fliesler Meyer LLP

(57) ABSTRACT

The present invention relates to systems, methods, and computer readable media for generating custom administrative tools. An administrative framework is provided that abstracts the implementation of certain administrative functions. A management Application Programming Interface (API) receives calls submitted in a preconfigured format from interface components generated by a developer or third party. The management API processes the calls and performs the functions associated with the calls. Multiple implementations are provided, through which an interface component can access the management API.

27 Claims, 5 Drawing Sheets

SYSTEM AND METHOD FOR UTILIZING A COMMON FRAMEWORK FOR PORTAL ADMINISTRATION TOOLS

PRIORITY CLAIM

The present application is a nonprovisional of Application No. 60/571,105, entitled: SYSTEM AND METHOD FOR UTILIZING A COMMON FRAMEWORK FOR PORTAL ADMINISTRATION TOOLS by Inventors: Robert Ritchy, et. al., filed May 14, 2004, the contents of which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to an architecture for generating administrative tools for web portals. The present invention relates more particularly to the creation and utilization of an architecture layer that abstracts certain functions to enable the easy creation of custom administrative tools.

BACKGROUND OF THE INVENTION

Since its inception in 1995, the Java programming language has become increasingly popular. Java, which is an interpreted language, enabled the creation of applications which could be run on a wide variety of platforms. This ability to function across a variety of different client platforms and Java's relatively easy implementation of network applications has resulted in its use in endeavors as basic as personal webpages to endeavors as complex as large business-to-business enterprise systems.

As Java has become more commonplace, a wide variety of tools and development platforms have been created to assist developers in the creation and implementation of Java applications and portals, which provide a way to aggregate content and integrate applications, allowing a visitor to a Web site to access the content and applications via a user interface. Particularly, a number of products have arisen to assist in the design of customized web portals that provide tools for managing the portals and previously generated content that can be included in the portals. These products provide graphics, content, sample portlets (applications that run within a portal), and tools for interacting with and modifying the same. One such product is WebLogic Portal by BEA Systems.

One of the most significant features for any portal or group of portals is the ability to be easily modified and configured. While many portal-oriented products include packaged administrative tools, developers and administrators of portals often desire to use their own custom tools. However, doing so involves the replication of many layers of additional code for modifying and administering portals.

What is needed is a means for enabling the easy creation of portal administrative tools.

DETAILED DESCRIPTION

The present invention relates to systems, methods, and computer readable media for generating custom administrative tools. An administrative framework is provided that abstracts the implementation of certain administrative functions. A management Application Programming Interface (API) receives calls submitted in a preconfigured format from software components generated by a developer or third party. The management API processes the calls and performs the functions associated with the calls. Multiple implementations are provided, through which a software component can access the management API.

Figure 1:
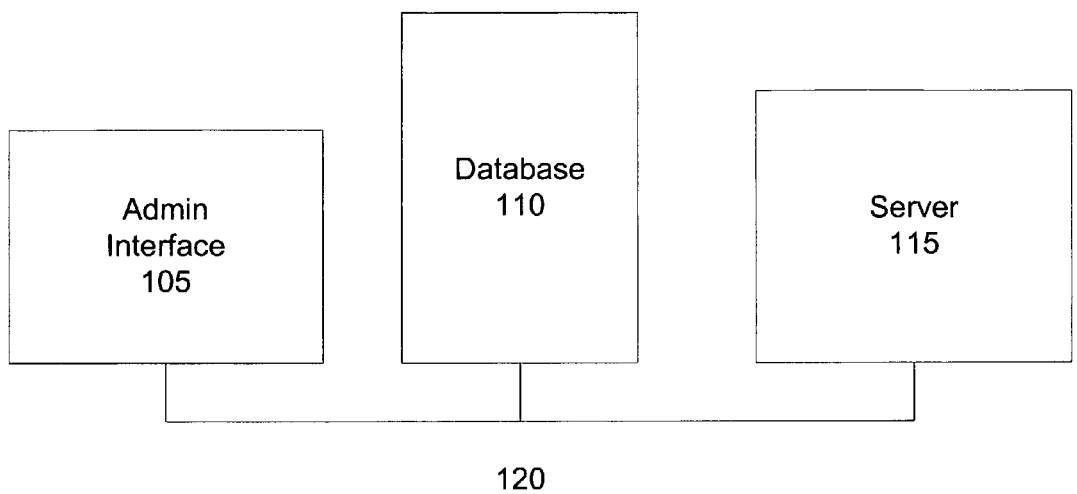
FIG. 1 illustrates one embodiment of a system for portal administration.

FIG. 1 illustrates one embodiment of a system 100 for portal administration. The system includes an administrative interface 105, one or more databases 110, and a server 115 connected through a network 120. The network 120 can include but is not limited to: public and/or private networks, wireless networks, optical networks, and satellite based communication links. Other suitable communication means can include but are not limited to: random access memory, file system(s), distributed objects, persistent storage, and inter-processor communication networks. The server 115 is a server that supports a web portal and various Java applications. In one embodiment, the server 115 utilizes WebLogic® Server, available from BEA Systems. The one or more databases 110 can include but is not limited to: relational databases, object-oriented databases, file systems, or any other kind of persistent storage. In one embodiment, the databases store portal content that is manipulated through the user interface 105 and accessed by the server 115 during its operation. The administrative interface 105 is an interface which can be remote or local to the server 115 that is used to configure, modify, and extend the server 115.

Figure 2:
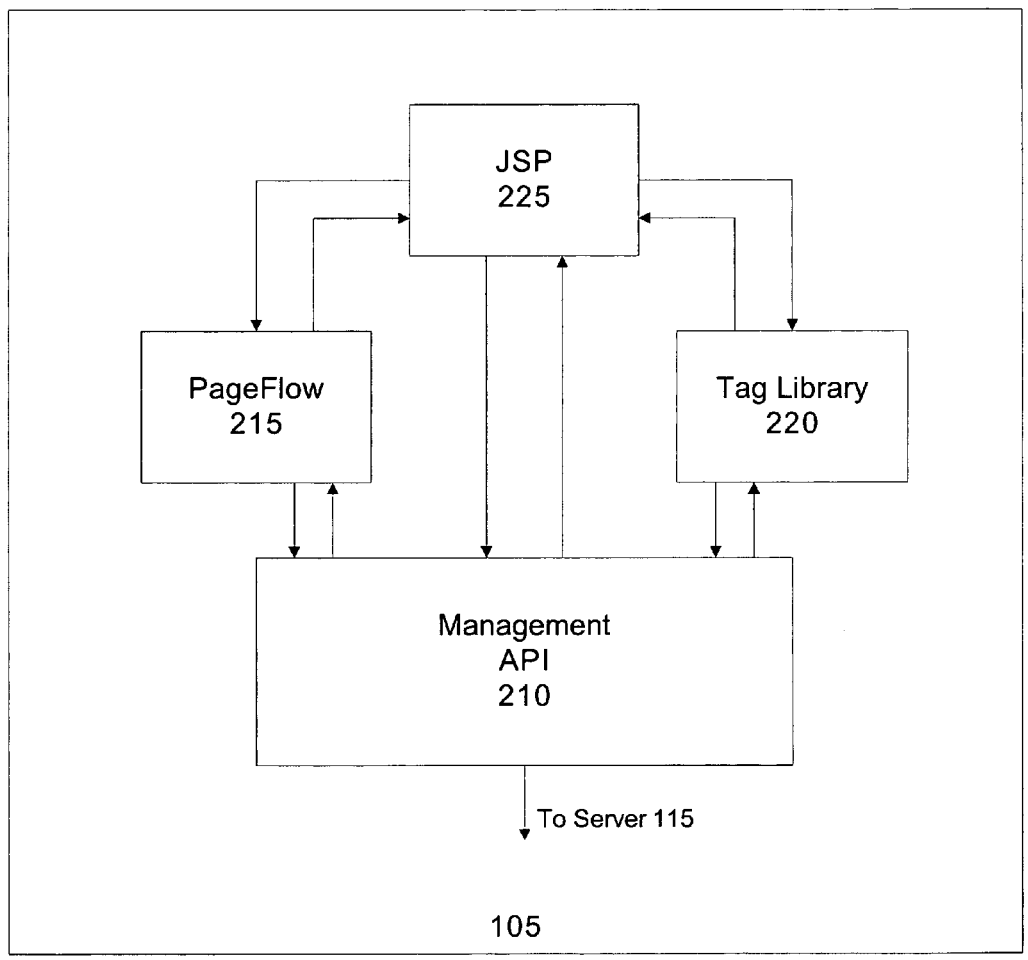
FIG. 2 illustrates one embodiment of an architecture for organizing administrative tools.

FIG. 2 illustrates one embodiment of an architecture for organizing administrative tools. A Java Server Page (JSP) 225 interacts with a tag library 220, a page flow system 215, and a management API 210 to modify and administer a portal stored on the server 115. While in the present embodiment, these components are part of the admin interface 105, in alternate embodiments, some or all of the components can be stored in the server 115. The Java Server Page, in response to commands submitted by a user, transmits commands through the page flow system 215, the tag library 220, or directly to the management API 210.

The JSP 225 can be a conventional java server page that includes Java code which controls the content viewed on the page. The code is processed by a server storing the JSP, which then presents the content to a remote user as a standard web page. In the present embodiment, the JSP is utilized by an administrator to administer a portal managed by the server 115. While in the present embodiment, a JSP is used to present an administrative interface, in alternate embodiments any number of arrangements can be used to generate the interface. By way of a non-limiting example, the user interface presented can include one or more of the following: 1) a graphical user interface (GUI); 2) an ability to respond to sounds and/or voice commands; 3) an ability to respond to input from a remote control device (e.g., a cellular telephone, a personal digital assistant, or other suitable remote control); 4) an ability to respond to gestures (e.g., facial and otherwise); 5) an ability to respond to commands from a process on the same or another computing device; and 6) an ability to respond to input from a computer mouse and/or keyboard.

The JSP 225 accepts commands through an interface for various administrative functions. These functions can include the modification, creation, and removal of portals, portlets, books, pages, or any other content, the creation and modification of user and group permissions, and any other functions that might be employed through a portal administrative interface.

The JSP 225, upon receiving a request through an interface, passes a command to the management API 210 directly, or through the page flow system 215 or the tag library 220. The mechanism through which the JSP 225 interacts with the API is configured in the JSP as described in FIG. 3. The page flow system 215 includes groups of files that implement a particular user interface feature. In one embodiment, each interface component implemented through the JSP 225 has an associated group of files. The page flow system performs tasks such as validating submitted form data or other information submitted from the JSP 225, submitting a call to the management API 210, handling flow possibilities that come from the call, and handling the presentation of the resulting page. For example, the page flow system, upon receiving a call from the JSP having particular parameters, such as the creation of a portal instance, verifies that the parameters are properly formatted before passing a call to the management API 210.

The tag library 220 stores groupings of common functions performed by applications in association with tags. The JSP 225 utilizes the tag library by including tags associated with particular functions in its source code. The tag library then utilizes the management API 210 to implement the functions accessed through the JSP. As indicated above, in some embodiments, the JSP 225 accesses the management API directly. In these embodiments, the JSP includes its own exception handling, flow management, and validation.

The commands generated through any of the above mechanisms are then passed to the management API 210, either directly, or through the appropriate intermediaries. The management API 210 includes a control facade that acts as a front-end for the API 210 and is configured to receive calls from the tag library 220, page flow 215, or JSP 225, and functional modules that perform the requested functions. The management API 210 includes functionality for accessing, creating, and modifying portal definitions and accessing, creating, and modifying portal instances. In some instances, upon implementing a call, the management API provides a response, which is then returned directly, or through the tag library 220 or page flow 215 to the java server page 225.

Figure 3:
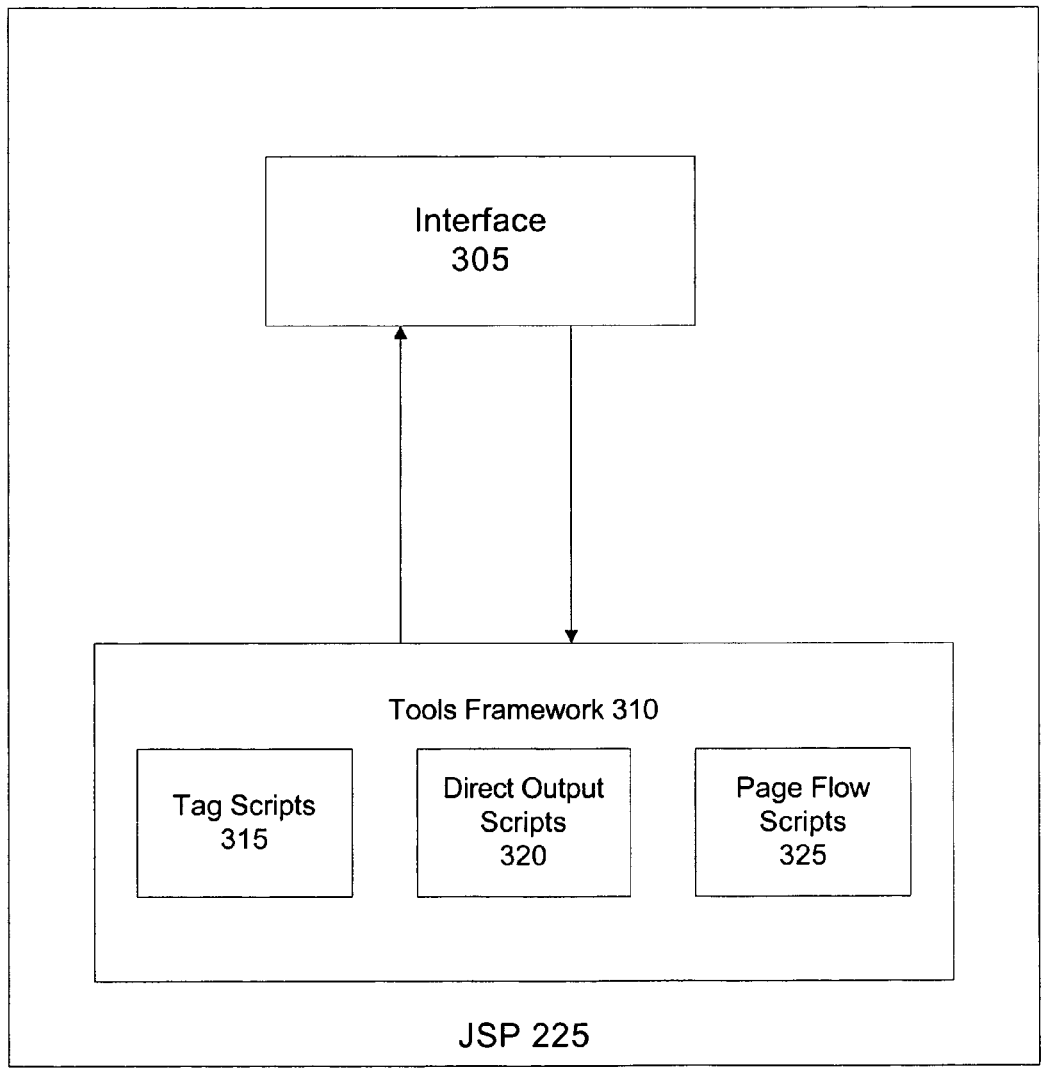
FIG. 3 is a block diagram illustrating a logical overview of one embodiment of a Java Server Page.

FIG. 3 is a block diagram illustrating a logical overview of one embodiment of the JSP 225. The JSP includes interface components 305 that receive commands directly from users of the JSP, such as administrators, and a tools framework 310, such as tag scripts 315, direct output scripts 320, and page flow scripts 325. The tag scripts 315 are designed to pass calls initiated through the interface 305 to the tag libraries 220. In one embodiment, various function calls implemented through the JSP have associated tags, and the titles of the tags are stored in the JSP in association with an interface component, such that when the interface component is utilized, the library function is called. The code below is configured to generate an interface component that can be utilized to add a page to a book instance:

```
<PortalTools:addPageToBookInstance bookId="2"
WebAppName="myWebApp"
portalPath="portalPath"
desktopPath="desktop Path"/>
```

The JSP may also submit calls through the page flow scripts 325. In one embodiment, the page flow scripts 325 are implemented through a page flow FormBean, the output of which is passed to the Page Flow 215. Shown below is one embodiment of a page flow FormBean. This FormBean would cause an interface element titled "AddNewPageToBook" to be shown and would add a new page to an existing book within a portal in response to a user accessing the interface element. The interface would also accept information for a book ID, a desktop path for the book, and a path for the portal storing the book.

```
<netui:form action="show_addNewPageToBook">
BookId:<netui:textBox
    dataSource="{actionForm.bookId}">
DesktopPath:<netui               :textBox
    dataSource="{actionForm.DesktopPath}">
PortalPath:<netui:textBox
    dataSource="{actionForm.Portal.Path}">
Netui:button value=Submit" type="submit">
</netui:form>
```

Additionally, the JSP can access the management API 210 through direct access methods, where the JSP includes code for contacting the API directly. Shown below is one example of code for adding a page to a book instance that could be used in a JSP to access the management API directly. This code does not include error handling, form validation, or exception handling.

```
<netui-data:declareControl controlId="portalControl"
type=PortalToolsControl.PortalTools"   netui-data:declare-
    Control/>
<netui-data:callControl controlId="portalControl"
method="addNewPageToBookInstance">
<netui-data:methodParameter value="SomeBookId"></netui-data:methodParameter>
<netui-data:methodParameter   value="webAppName"></netui-data:methodParameter>
<netui-data:methodParameter value="PortalPath"></netui-data:methodParameter">
<netui-data:methodParameter   value="desktopPath"></netui-data:methodParameter">
<netui-data:methodParameter     value="type=HttpServlet
    Request></netui-data:methodParameter"></netui-data:callControl>
```

The implementations for error handling, form validation, flow management, and other functions are preferably provided by a designer of the administrative tools and may use a previously generated framework that includes its own implementation of error handling, form validation, flow management, and other functions.

Figure 4:
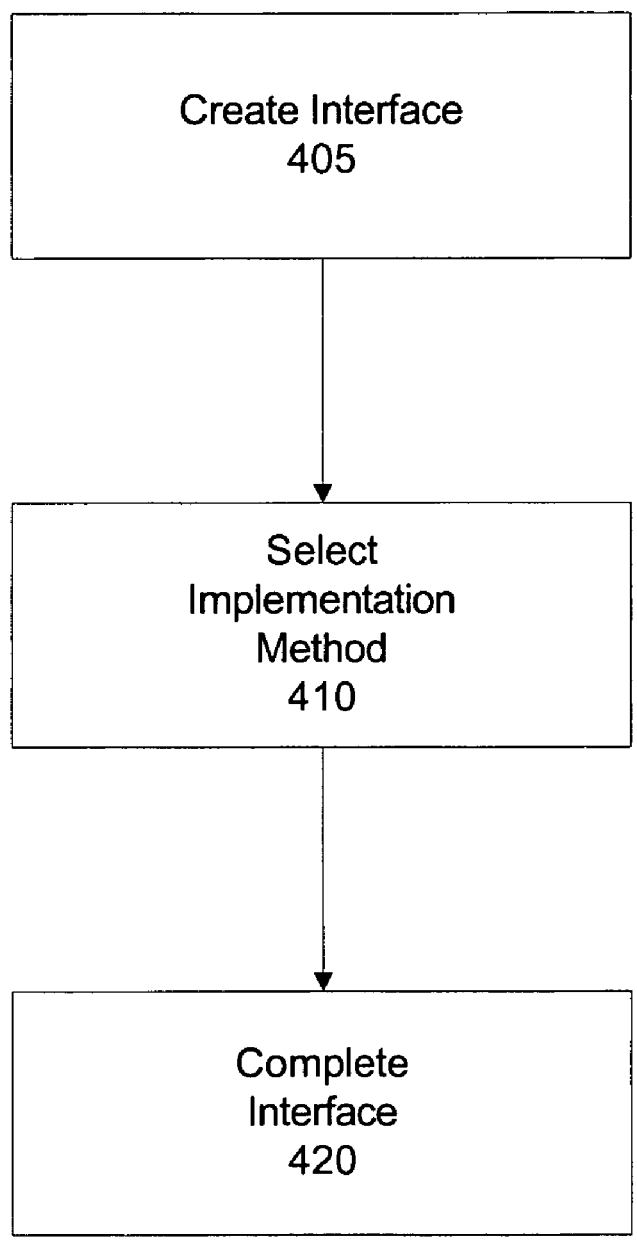
FIG. 4 illustrates one embodiment of a process for adding a function to a set of custom administrative tools.

FIG. 4 illustrates one embodiment of a process for adding a function to a set of custom administrative tools. In step 405, a creator of the administrative tools creates an interface component. The interface component can be a button, menu item, form, or any other interface component. While in the present embodiment, the interface is implemented through a JSP, in alternate embodiments, any number of different front-ends can be utilized for presenting the interface. In step 410 an implementation method is selected. The interface component can be configured to call the management API directly, through library tags, through a page flow system, or through any other intermediary mechanism.

In step 420, the interface is completed. This step entails associating the interface component with an existing interface framework. For example, this step could include placing a menu item or button in an existing portal.

Figure 5:
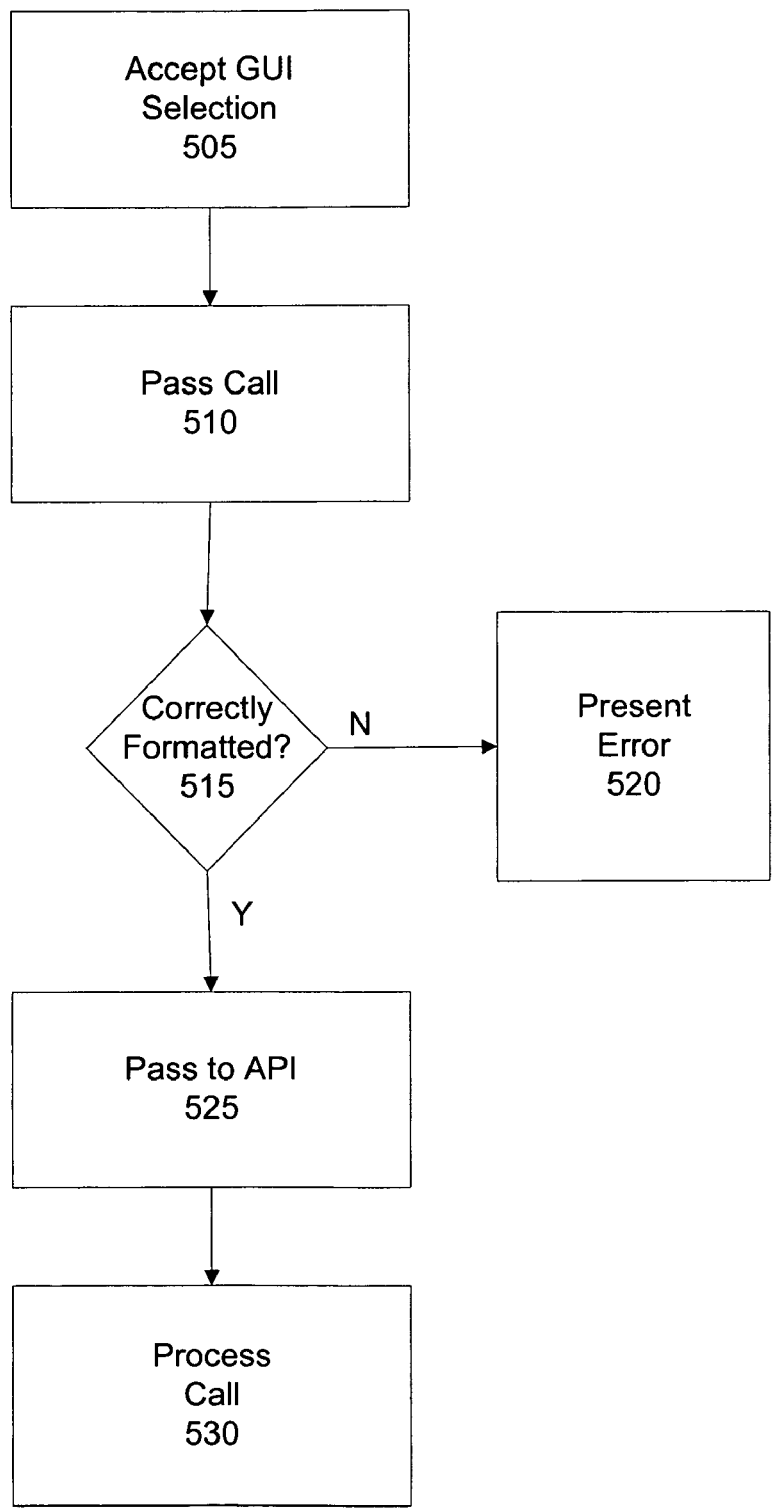
FIG. 5 illustrates the execution of a function with a set of custom administrative tools.

FIG. 5 illustrates the execution of a function with a set of custom administrative tools. In step 505, the JSP accepts a command through its interface. For example, a user could click on a button, select a menu item, or submit a form. In step 510, the JSP passes a call to the page flow or other intermediary. In step 515, the intermediary determines whether the request is properly formatted. For example, a command to add a page to a book would require a portal path, desktop path, and book ID. If the call is not formatted properly, in step 520 an error message is generated. Steps 515 and 520 can also be implemented by code on the JSP page itself, in the case of direct access of the API.

If the call is formatted correctly, in step 520 the call is passed to the management API. In step 530 the management API performs the action associated with the call.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for creating an administrative tool for a portal, the method comprising:

providing an administrative interface to administer the portal, wherein the administrative interface includes a server page, a tag library, a page flow system and a management application program interface (API), wherein the server page, in response to a request from the administrative interface to administer the portal, transmits commands through one of the tag library and the page flow system to the management application program interface (API), and wherein the management API processes the request to administer the portal, and wherein the portal is stored on a computer readable storage medium;

wherein the management API includes
  a control facade configured to receive the commands from one of the tag library, the page flow system and the server page, wherein the control facade includes functional modules to perform administrative functions, and wherein
  the administrative functions are used to administer the portal in response to the request from the administrative interface, wherein the administrative functions include one of managing a portal instance, modifying a portal instance, modifying a portal definition, creation and removal of portals, portlets, books, pages, portal content and creation and modification of user and group permissions,
  wherein the management API allows external software components to manage the portal using the administrative functions of the management API;

administering the portal by generating an interface component at the portal, wherein the interface component is configured to invoke a function in the management API through at least one of a page flow component and a tag, and wherein
  the page flow component is located in the page flow system and includes groups of files that implement the interface component at the portal, and wherein the page flow component validates invocation of the administrative function from the interface component, handles flow possibilities resulting from the invocation including specifying a resulting page to transition to, and invokes the administrative function at the management API, and
  the tag is located in the tag library and stores groupings of administrative functions and utilizes the management API to implement the groupings of administrative functions, and associating the interface component with the administrative function in the management API that administers the portal, said interface component configured to invoke creation of a portal instance;

generating the portal instance in response to the administrative function.

2. The method of claim 1, wherein the interface component comprises a menu item.

3. The method of claim 1, wherein the interface component comprises a button.

4. The method of claim 1, wherein the interface component comprises a form.

5. The method of claim 1, wherein the interface component comprises a link.

6. The method of claim 1, wherein the server page is configured to communicate directly with the management API.

7. A non-transitory computer readable storage medium having machine readable instructions stored thereon that when executed by a processor cause a system to:
provide an administrative interface to administer the portal, wherein the administrative interface includes a server page, a tag library, a page flow system and a management application program interface (API), wherein the server page, in response to a request from the administrative interface to administer the portal, transmits commands through one of the tag library and the page flow system to the management application program interface (API), and wherein the management API processes the request to administer the portal, and wherein the portal is stored on a computer readable storage medium;
wherein the management API includes
a control facade configured to receive the commands from one of the tag library, the page flow system and the server page, wherein the control facade includes functional modules to perform administrative functions, and wherein
the administrative functions are used to administer the portal in response to the request from the administrative interface, wherein the administrative functions include one of managing a portal instance, modifying a portal instance, modifying a portal definition, creation and removal of portals, portlets, books, pages, portal content and creation and modification of user and group permissions,
wherein the management API allows external software components to manage the portal using the administrative functions of the management API;
administer the portal by generating an interface component at the portal, wherein the interface component is configured to invoke a function in the management API through at least one of a page flow component and a tag, and wherein
the page flow component is located in the page flow system and includes groups of files that implement the interface component at the portal, wherein the page flow component validates invocation of the administrative function from the interface component, handles flow possibilities resulting from the invocation including specifying a resulting page to transition to, and invokes the administrative function at the management API, and
the tag is located in the tag library and stores groupings of administrative functions and utilizes the management API to implement the groupings of administrative functions, and
associate the interface component with the administrative function in the management API that administers the portal, said interface component configured to invoke creation of a portal instance;
generate the portal instance in response to the administrative function.

8. The non-transitory computer readable storage medium of claim 7, wherein the interface component comprises a menu item.

9. The non-transitory computer readable storage medium of claim 7, wherein the interface component comprises a button.

10. The non-transitory computer readable storage medium of claim 7, wherein the interface component comprises a form.

11. The non-transitory computer readable storage medium of claim 7, wherein the interface component comprises a link.

12. The non-transitory computer readable storage medium of claim 7, wherein the server page is configured to access the management API directly.

13. A system for administering a portal, the system comprising:
an administrative interface to administer the portal, wherein the administrative interface includes a server page, a tag library, a page flow system and a management application program interface (API), wherein the server page, in response to a request from the administrative interface to administer the portal, transmits commands through one of the tag library and the page flow system to the management application program interface (API), and wherein the management API processes the request to administer the portal;
a control facade at the management API configured to receive the commands from one of the tag library, the page flow system and the server page, wherein the management API includes administrative functions used to administer the portal in response to the request from the administrative interface, and wherein the administrative functions include one of managing a portal instance, modifying a portal instance, modifying a portal definition, creation and removal of portals, portlets, books, pages, portal content and creation and modification of user and group permissions;
wherein the management API allows external software components to manage the portal using the administrative functions of the management API;
wherein upon receiving the request to administer the portal an interface component is generated and is configured to invoke a function in the management API through at least one of a page flow component and a tag, and wherein
the page flow component is located in the page flow system and includes groups of files that implement the interface component at the page in the portal, wherein the page flow component validates invocation of the administrative function from the interface component, handles flow possibilities resulting from the invocation including specifying a resulting page to transition to, and invokes the administrative function at the management API, and
the tag is located in the tag library and stores groupings of administrative functions and utilizes the management API to implement the groupings of administrative functions; and
one or more functional modules configured to execute the plurality of administrative functions in response to the requests received at the facade component, wherein executing the plurality of administrative functions includes
associating the interface component with the administrative function in the management API that administers the portal, said interface component configured to invoke creation of a portal instance, and generating the portal instance in response to the administrative function.

14. The system of claim 13, wherein the one or more interface components comprise a menu item.

15. The system of claim 13, wherein the one or more interface components comprise a button.

16. The system of claim 13, wherein the one or more interface components comprise a form.

17. The system of claim 13, wherein the one or more interface components comprise a link.

18. The system of claim 13, wherein another of the plurality of administrative functions comprise managing a portal instance.

19. The system of claim 13, wherein the server page is configured to access the management API directly.

20. The method of claim 1, wherein the management API, in response to invocation of the administrative function at the management API, provides a response that is returned to the page.

21. The method of claim 1, wherein the call to the action in the page flow component includes one or more parameters that specify the portal to operate upon and administer.

22. The method of claim 1 wherein the page flow component validates submitted form data before submitting a call to the management API.

23. The method of claim 1 wherein associating the interface component with the function includes embedding within the page a call to an action in the page flow component.

24. The method of claim 23 wherein the action in the page flow component validates the invocation of the creation of the portal instance.

25. The method of claim 1 wherein the administrative interface is remotely accessed.

26. The method of claim 1 wherein the server page includes tag scripts adapted to transmit requests to the tag library to the management API.

27. The method of claim 1 wherein the server page includes page flow scripts adapted to transmit requests using a page flow managed bean to the management API.

* * * * *